United States Patent [19]

Jean

[11] 4,205,110
[45] May 27, 1980

[54] SURFACE COVERINGS FOR WALLS, CEILINGS AND THE LIKE

[76] Inventor: Raymond W. Jean, 90 LaSalle St., New York, N.Y. 10017

[21] Appl. No.: 886,512

[22] Filed: Mar. 14, 1978

[51] Int. Cl.² .................. B32B 7/02; B32B 15/00; B32B 3/26
[52] U.S. Cl. .................................. 428/213; 428/284; 428/285; 428/315
[58] Field of Search ............. 428/203, 209, 211, 212, 428/213, 214, 215, 216, 236, 248, 249, 317, 318, 314, 315, 284, 285

[56] References Cited

U.S. PATENT DOCUMENTS

| | | | |
|---|---|---|---|
| 2,699,417 | 1/1955 | Repsher et al. | 428/460 |
| 3,511,335 | 5/1970 | Uddenborg | 428/137 |
| 3,972,467 | 8/1976 | Whillock et al. | 428/213 |
| 4,096,304 | 6/1978 | Greengrass | 428/236 |

FOREIGN PATENT DOCUMENTS 900876 7/1962 United Kingdom ................. 428/315

*Primary Examiner*—William J. Van Balen
*Attorney, Agent, or Firm*—Spellman, Joel & Pelton

[57] ABSTRACT

A thin, flexible covering material which provides a heat and vapor barrier for walls or ceilings comprises a first layer of vinyl or cloth on which a decorative design may be printed, a second layer of paper or cloth, a third layer of metal foil, and a fourth layer of paper or cloth, the layers being laminated together to form the covering material. Alternative embodiments include applications as floor coverings, rug underlays, wall sections, or window blinds. Optional layers of polymeric foam or wall board may be incorporated into the covering material for some applications.

3 Claims, 8 Drawing Figures

SYMBOLS USED:

| | |
|---|---|
| ///////// | FOIL (METAL) |
| xxxxxxxxxx | FABRIC |
| ‖‖‖‖‖‖‖‖‖‖ | PAPER |
| ooooooooo | FOAM, FIBERGLASS, MINERAL WOOL |
| ———— | ADHESIVE |
| ×⊬≠⊬×⊬ | WOOD, PLYWOOD OR COMPOSITION BOARD |
| \\\\\\\\\ | VINYL (PLIABLE SHEET) |

FIGURES ARE DIAGRAMMATIC & NOT TO ANY SCALE

SURFACE COVERINGS FOR WALLS, CEILINGS AND THE LIKE

BACKGROUND OF THE INVENTION

The present invention relates to surface covering materials applied directly to walls, ceilings, or floors of living spaces, and to materials such as blinds for covering windows. Significantly, the present invention also relates to the obviously desirable lessening of heat and vapor transmission through such surfaces of living spaces, and to the provision of such physical properties by material which is sturdy, durable, flame resistant, and esthetically pleasing.

It is well known that materials such as wallpaper can be used in a living space to change and enhance the esthetic effect of the space. However, the value of such materials in regulating heat flow, in providing a vapor barrier, or in furnishing any flame resistance characteristics to the covered surface, is practically nil. Materials such as rock wool or fiberglass insulation, or particulate or foam insulations, which are installed inside the wall spaces of a building, are well known means for regulating heat transfer between a living space and the external atmosphere. Such means, however, are extremely inconvenient to apply in a building which has already been completed, and furthermore contribute no esthetic effect to the living space and indeed may detract from the esthetic effect if substantial alteration of a wall, for instance, is necessary in order to install the desired insulation material.

There has now been discovered a group of composite materials, suitable for use in various embodiments as wall coverings, ceiling coverings, floor coverings such as rug underlays, and window blinds, which surprisingly and pleasantly afford both esthetic adaptability and a significant degree of control of heat and vapor transmission through a covered surface, in a material which is at the same time durable, wear and tear resistant, and flame resistant. The material of the present invention may be applied in the same way as conventional wall coverings such as wallpaper, and provide similar esthetic effects, but when installed the material also provides a permanent vapor barrier and radiant heat barrier which provides noticeable savings in energy costs to the user.

BRIEF SUMMARY OF THE INVENTION

The present invention provides several embodiments of surface coverings or structural material for use inside buildings, each embodiment furnishing a unique combination of properties including resistance to the passage of heat and vapor into or out of a room or other space in which the invention has been installed. The embodiments include several layers laminated together to form a composite, unitary material.

According to the invention, a wall or ceiling covering is formed of a composite material comprising a first layer of vinyl or fabric as the exposed surface of the covering, a second layer of paper or fabric, a third layer of metal foil, in particular aluminum foil, and a backing layer of fabric or paper. An optional layer of polymeric foam, fiberglass, or mineral wool may be incorporated between the second layer and the foil layer.

Alternatively, a ceiling covering comprises a first layer of vinyl or fabric, two layers each of which is paper or fabric, and a layer of metal foil. This composite material may also be used to form window blinds, e.g. vertical or rolled blinds.

A rug underlay and floor covering comprises a layer of fabric or jute, a layer of polymeric foam, fiberglass, or mineral wool, a layer of aluminum foil, a layer of paper or fabric, and another layer of fabric or jute. Alternatively, the rug underlay or floor covering comprises a layer of polymeric foam, fiberglass, or mineral wool, a layer of paper or fabric, a metal foil layer, and another layer of polymeric foam, fiberglass, or mineral wool.

A composite material suitable for use as a rigid covering for existing walls, or as a self-supporting wall section or partition, comprises a layer of wallboard material, a layer of fabric or paper, a metal foil layer, an optional layer of polymeric foam, fiberglass, or mineral wool, and a second layer of wallboard material.

A ceiling covering which combines acoustical properties with the heat and vapor barrier features of the present invention comprises a layer of polymeric foam, fiberglass, or mineral wool, a layer of paper, and a layer of metal foil.

BRIEF DESCRIPTION OF THE DRAWINGS

The accompanying

DETAILED DESCRIPTION OF THE INVENTION

The invention comprises a composite material of several layers laminated together, which material not only provides esthetic adaptability, in that the covering material may be given any desired colors or designs, but also possesses economic value through the physical properties of the material. Specifically, the invention provides a permanent vapor barrier and radiant heat transfer barrier in material which is simultaneously durable, wear, tear and abrasion resistant, and flame resistant. The material, even in the embodiments in which it is in a flexible, thin form, is unusually strong and handleable and can easily be applied with techniques analogous to those in use for previously known wall covering material.

With reference to the key accompanying FIGS. 1-8, the following definitions apply in this application unless stated otherwise. The foil referred to is aluminum foil having a thickness of from 0.00025 to 0.005 inches, and preferably on the order of 0.00035 inches. As fabric, known wall covering fabrics in customarily available thicknesses may be employed. The paper depicted in the FIGS. may be any conventional paper, such as kraft paper, and may be of a grade and thickness customarily used in wallpaper. As polymeric foam, polyethylene foam is suitable. The terms "fiberglass", "mineral wool," and "wood, plywood or composition board" define substances which are well-known. The vinyl sheet identified in the key is any known, opaque sheet or film, having a thickness of from about 3 to 5 mils.

Figure 1:
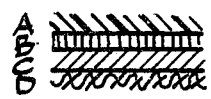
FIGS. 1-8 depict diagrammatically the composition of each layer of various exemplary embodiments of the present invention. The composition of a depicted layer is indicated by the particular symbol used for the layer; the symbols are defined in the key which accompanies the FIGS.

FIG. 1 shows the composition of a composite wall covering or ceiling covering in accordance with the present invention. Layer A is a vinyl sheet, having a thickness of 3 to 5 mils. Layer B is paper, having a thickness up to the thickness of conventional wallpaper. Layer C is a layer of aluminum foil, having a thickness of from 0.00025 to 0.005 inches, and preferably on the order of 0.00035 inches. Layer D is a layer of fabric.

While the composition depicted in FIG. 1 constitutes the preferred embodiment of this invention, alternate embodiments of the wall or ceiling covering material depicted in FIG. 1 are permitted. For instance, the paper layer depicted as layer B may be fabric, and layer D, shown as fabric in FIG. 1, may instead be paper.

Figure 2:
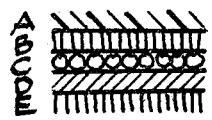

FIG. 2 depicts a further embodiment of the invention, in which a layer of polymeric foam, such as polyethylene foam, or fiberglass or mineral wool, is incorporated into the composite covering material. Referring to FIG. 2, layers A and B have the same permissible compositions and thicknesses as layers A and B, respectively, of FIG. 1. Layer C is a layer of polymeric foam, fiberglass, or mineral wool, having a thickness of 1/16 of an inch to ¾ of an inch, and preferably about three-thirty seconds of an inch. Layer D is a layer of aluminum foil, and layer E is depicted as a layer of paper but may also be a layer of fabric.

The wall and ceiling covering described herein may be made and sold in rolls from which the user may cut successive strips which are to be applied side by side to a wall or ceiling, in the manner customarily used for wallpaper. The vinyl layer A of FIGS. 1 and 2 is visible to the user after the material is put into place, and this layer can be given a decorative design, which can be repetitive or which can form in conjunction with adjacent strips a single figure or picture on a wall or ceiling. The covering material can be put into place by customary methods, such as by applying a permanent, non-injurious adhesive to the surface D of FIG. 1 or surface E of FIG. 2, and contacting the adhesive-laden surface with a portion of a suitably prepared wall or ceiling.

Figure 3:
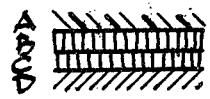

FIG. 3 depicts a material which may be used as a ceiling covering, or which may be incorporated into window blinds. Layer A is a vinyl sheet, from 3 to 5 mils in thickness. Layers B and C, as shown in FIG. 3, may both be layers of paper. However, either or both of these layers may be made of fabric. Layer D is a layer of metal foil.

The ceiling covering depicted in FIG. 3 may be made, sold, and put into place in the manner described above for ceiling coverings such as those depicted in FIGS. 1 and 2. Window blinds may also be made from the material depicted in FIG. 3; the blinds may be vertical, i.e. comprising a number of parallel vertical strips, or rolled, i.e. comprising one sheet which has approximately the dimensions of the window and which is installed with ropes and pulleys by which the blinds may be simultaneously raised and rolled up.

Figure 4:
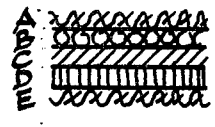
Figure 5:
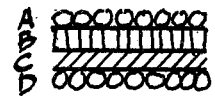

The present invention also comprises floor coverings such as rug underlays, two embodiments of which are depicted in FIGS. 4 and 5. In FIG. 4, layer A is a layer of fabric, for which jute is the preferred material. Layer B consists of polymeric foam, such as polyethylene foam, or fiberglass or mineral wool, this layer having a thickness of ½ inch to 1 inch, and preferably ½ inch. Layer C is a layer of aluminum foil. Layer D is depicted as a layer of paper, although this layer may optionally be of fabric. Layer E, like layer A, is a fabric layer preferably consisting of jute. The overall thickness of the composite material should be between ¾ and 1-¼ inches.

The rug underlay of FIG. 5 has outer layers A and D consisting of polymeric foam, such as polyethylene foam, or fiberglass or mineral wool, each layer having a thickness within the range of ½ inch to 1 inch. Layer B, shown as a layer of paper, may optionally be a layer of fabric. Layer C is an aluminum foil layer. The overall thickness of this composite material should be between ¾ and 1-¼ inches.

The rug underlays of this invention may be made and used in a manner analogous to known rug underlays. That is, the composite material may be prepared in large sheets having lengths and widths equal to standard lengths and widths of rugs, such as 9 feet by 12 feet, and then rolled up until ready for use.

Figure 6:
Figure 7:
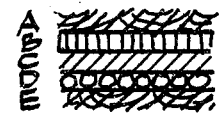

The novel features of the present invention may also be realized in rigid sections of composite material suitable as wall coverings or as self-supporting partitions. FIGS. 6 and 7 illustrate the composite structures of two embodiments of this rigid material. In FIG. 6, outside layers A and D are formed of wood, plywood, or any of the customary wall board materials such as composition board. The thickness of each material will be determined by practical considerations and by the dimensions of available materials. Satisfactory materials include those customarily available in thicknesses ranging from 1/16 of an inch to ¾ of an inch. Layer B in FIG. 6 is a paper layer, although this layer may also be fabric. Layer C is an aluminum foil layer. FIG. 7 depicts a variant of the composite material of FIG. 6, in which a layer D of polymeric foam, fiberglass, or mineral wool is incorporated between the aluminum foil layer and one layer of wall board or wood. In each of these embodiments, the aluminum foil layer will have a thickness of 0.001 to 0.005 inches.

The material illustrated in FIGS. 6 and 7 may be made in sections having the customary dimensions of sections of wood currently used in constructing or resurfacing walls, such as 4 feet by 8 feet or 3 feet by 4 feet.

Figure 8:

FIG. 8 illustrates another embodiment of the present invention suitable for use as a ceiling covering, in which layer A comprises a layer of polymeric foam, fiberglass, or mineral wool, layer B is a layer of paper, and layer C is a layer of aluminum foil.

All of the embodiments of the present invention described or discussed above may be constructed by laminating together the various layers of material which together form the composite material of the present invention. The techniques and materials used for the laminating will be evident to one of ordinary skill in that art. One would recognize, for instance, that the adhesives used to unite adjacent layers of the composite material should be capable of forming a permanent bond, and should not be injurious or corrosive to the bonded layers of the composite material.

Surface coverings in accordance with the present invention provide a unique combination of properties. Significantly, the coverings furnish a vapor barrier, which provides several advantages not available in ordinary wallpaper. The vapor barrier decreases heat transmission through a wall which has a covering of the present invention. The vapor barrier permits a particular level of comfort to be maintained at a lower room temperature, even when the surrounding atmosphere is excessively humid. Furthermore, the vapor barrier is particularly useful in laboratories or hospitals bacause it makes much easier the control of temperature and humidity in a room environment, and because it prevents the undesired entry of vapor which may carry contaminants.

The coverings of the present invention also act as a significant barrier to the transmission of radiant heat.

Thus, when the external environment is below the temperature of a living space in which coverings of the present invention have been put into place, a surface covering of the present invention will cause the space to retain 80 to 95% of the heat which would otherwise be radiated to the external atmosphere. Similarly, when the external atmosphere is hotter than the enclosed living space, 95 to 97% of the heat which would otherwise be radiated into the enclosed space is kept out.

The combined effects of the vapor barrier and radiant heat barrier will conserve the energy that will otherwise be necessary to regulate the humidity and temperature of an enclosed living space, resulting in savings which can be on the order of 10% in the cost of heat and 5% in the cost of electricity necessary for such regulation.

The composite materials of the present invention also provide a combination of properties which makes them especially useful as construction or decoration materials. The particular combinations described hereinabove provide a composite material which is easily handleable, wear and tear resistant both in handling and in situ, and washable. The material also has acceptable ratings as to fire resistance, which makes it even more preferable for use in decorating or redecorating living spaces. The materials of the present invention combine these advantages with the feature that when desired the visible surface can be provided with various designs. Thus, the composite covering material of the present invention combines the esthetic adaptability necessary for such material with physical properties which make the present invention an economically valuable product.

I claim:

1. A flexible unitary, multi-layer surface covering material for walls and ceilings comprising:
   (a) an outer layer of opaque vinyl 3 to 5 mils thick;
   (b) a second layer of material next to said outer layer, said second layer of material selected from the group consisting of paper and fabric;
   (c) a third layer next to said second layer, said third layer being aluminum foil with a thickness of 0.00025 to 0.005 inches; and
   (d) a backing layer of material next to said third layer, said backing layer of material selected from the group consisting of paper and fabric;
   said layers being laminated together via an adhesive continuous and co-extensive with each next adjacent layer.

2. A flexible, unitary, multi-layer surface covering material for walls and ceilings comprising;
   (a) an outer layer of opaque vinyl 3 to 5 mils thick;
   (b) a second layer of material next ot said outer layer, said second layer of material selected from the group consisting of paper and fabric;
   (c) a third layer of material next to said second layer, said third layer of material selected from the group consisting of polymeric foam, fiberglass, and mineral wool, said third layer being from 1/16 to ¾ inches thick;
   (d) a fourth layer next to said third layer, said fourth layer being aluminum foil with a thickness of 0.00025 to 0.005 inches; and
   (e) a backing layer of material next to said fourth layer, said backing layer of material selected from the group consisting of paper and fabric; said layers being laminated together.

3. A surface covering material as claimed in claim 1 wherein said second layer is paper and said backing layer is fabric.